(12) United States Patent
Turcan et al.

(10) Patent No.: US 9,794,410 B2
(45) Date of Patent: *Oct. 17, 2017

(54) METHODS, SYSTEMS, AND PRODUCTS FOR ROUTING COMMUNICATIONS

(71) Applicant: AT&T INTELLECTUAL PROPERTY I, LP, Atlanta, GA (US)

(72) Inventors: Diane Brown Turcan, Smyrna, GA (US); David L. Wellons, Marietta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/138,549

(22) Filed: Apr. 26, 2016

(65) Prior Publication Data

US 2016/0241715 A1    Aug. 18, 2016

Related U.S. Application Data

(63) Continuation of application No. 14/291,036, filed on May 30, 2014, now Pat. No. 9,363,376, which is a continuation of application No. 12/617,753, filed on Nov. 13, 2009, now Pat. No. 8,767,943, which is a continuation of application No. 10/335,113, filed on Dec. 31, 2002, now Pat. No. 7,620,170.

(51) Int. Cl.
| | |
|---|---|
| *H04M 3/00* | (2006.01) |
| *H04M 3/51* | (2006.01) |
| *H04M 3/42* | (2006.01) |
| *H04M 3/523* | (2006.01) |

(52) U.S. Cl.
CPC ....... *H04M 3/5191* (2013.01); *H04M 3/4211* (2013.01); *H04M 3/42263* (2013.01); *H04M 3/42323* (2013.01); *H04M 3/42357* (2013.01); *H04M 3/5183* (2013.01); *H04M 3/5232* (2013.01); *H04M 2203/2072* (2013.01); *H04M 2203/6054* (2013.01)

(58) Field of Classification Search
CPC . H04M 3/5191; H04M 3/4211; H04M 3/5232
USPC ....... 379/265.01–265.14, 266.01–266.1, 309
See application file for complete search history.

(56) References Cited

U.S. PATENT DOCUMENTS

| | | |
|---|---|---|
| 4,817,130 A | 3/1989 | Frimmel, Jr. |
| 4,979,206 A | 12/1990 | Padden et al. |
| 5,062,103 A | 10/1991 | Davidson et al. |
| 5,062,133 A | 10/1991 | Melrose |
| 5,113,429 A | 5/1992 | Morley, Jr. et al. |
| 5,278,955 A | 1/1994 | Forte et al. |
| 5,283,856 A | 2/1994 | Gross et al. |
| 5,418,628 A | 5/1995 | Perkins |
| 5,559,855 A | 9/1996 | Dowens et al. |

(Continued)

OTHER PUBLICATIONS

NEC, Fusion Certification Announcement, Oct. 24, 2000, 3 pages.

*Primary Examiner* — William Deane, Jr.
(74) *Attorney, Agent, or Firm* — Scott P. Zimmerman, PLLC

(57) ABSTRACT

Methods, systems, and products route communications according to schedules. When an incoming communication is detected, a schedule is retrieved that is associated with a recipient's address. A time associated with the communication is compared to entries in the schedule. If a match is determined, then an alternate destination may be chosen.

20 Claims, 12 Drawing Sheets

(56) References Cited

U.S. PATENT DOCUMENTS

| | | | |
|---|---|---|---|
| 5,619,991 A | 4/1997 | Sloane | |
| 5,651,058 A | 7/1997 | Hackett-Jones et al. | |
| 5,678,179 A | 10/1997 | Turcotte et al. | |
| 5,711,297 A | 1/1998 | Iliff | |
| 5,748,100 A | 5/1998 | Gutman et al. | |
| 5,764,731 A | 6/1998 | Yablon | |
| 5,815,566 A | 9/1998 | Ramot et al. | |
| 5,822,418 A | 10/1998 | Yacenda et al. | |
| 5,841,854 A | 11/1998 | Schumacher et al. | |
| 5,867,821 A | 2/1999 | Ballantyne et al. | |
| 5,868,669 A | 2/1999 | Iliff | |
| 5,872,841 A | 2/1999 | King et al. | |
| 5,878,130 A | 3/1999 | Andrews et al. | |
| 5,915,010 A | 6/1999 | McCalmont | |
| 5,917,893 A | 6/1999 | Katz | |
| 5,924,074 A | 7/1999 | Evans | |
| 5,930,759 A | 7/1999 | Moore et al. | |
| 5,940,740 A | 8/1999 | Aas et al. | |
| 5,946,659 A | 8/1999 | Lancelot et al. | |
| 5,951,645 A | 9/1999 | Goto | |
| 5,963,864 A | 10/1999 | O'Neil | |
| 6,006,206 A | 12/1999 | Smith et al. | |
| 6,009,432 A | 12/1999 | Tarin | |
| 6,018,713 A | 1/2000 | Coli et al. | |
| 6,035,021 A | 3/2000 | Katz | |
| 6,052,442 A | 4/2000 | Cooper et al. | |
| 6,075,787 A | 6/2000 | Bobeck et al. | |
| 6,088,429 A | 7/2000 | Garcia | |
| 6,088,677 A | 7/2000 | Spurgeon | |
| 6,112,183 A | 8/2000 | Swanson et al. | |
| 6,119,108 A | 9/2000 | Holmes et al. | |
| 6,122,485 A | 9/2000 | Archer | |
| 6,125,176 A | 9/2000 | Foladare et al. | |
| 6,137,524 A | 10/2000 | Chea | |
| 6,137,876 A | 10/2000 | Wong et al. | |
| 6,151,586 A | 11/2000 | Brown | |
| 6,185,603 B1 | 2/2001 | Henderson et al. | |
| 6,201,804 B1 | 3/2001 | Kikinis | |
| 6,206,829 B1 | 3/2001 | Iliff | |
| 6,229,888 B1 | 5/2001 | Miloslavsky | |
| 6,272,319 B1 * | 8/2001 | Narusawa | G08B 3/1025 340/7.2 |
| 6,282,565 B1 | 8/2001 | Shaw et al. | |
| 6,295,551 B1 | 9/2001 | Roberts et al. | |
| 6,305,007 B1 | 10/2001 | Mintz | |
| 6,310,543 B1 | 10/2001 | Yoshioka et al. | |
| 6,324,279 B1 | 11/2001 | Kalmanek et al. | |
| 6,339,593 B1 | 1/2002 | Kikinis | |
| 6,366,658 B1 | 4/2002 | Bjornberg et al. | |
| 6,373,817 B1 | 4/2002 | Kung et al. | |
| 6,373,871 B1 | 4/2002 | Hemmes et al. | |
| 6,374,229 B1 | 4/2002 | Lowrey et al. | |
| 6,408,068 B1 | 6/2002 | Larson et al. | |
| 6,411,947 B1 | 6/2002 | Rice et al. | |
| 6,434,121 B1 | 8/2002 | Davidson et al. | |
| 6,445,784 B2 | 9/2002 | Uppaluru et al. | |
| 6,456,594 B1 | 9/2002 | Kaplan et al. | |
| 6,462,656 B2 | 10/2002 | Ulrich et al. | |
| 6,473,404 B1 | 10/2002 | Kaplan et al. | |
| 6,482,156 B2 | 11/2002 | Iliff | |
| 6,496,878 B1 | 12/2002 | Azevedo et al. | |
| 6,501,562 B1 | 12/2002 | Nakagiri et al. | |
| 6,532,489 B1 | 3/2003 | Merchant | |
| 6,539,393 B1 | 3/2003 | Kabala | |
| 6,561,809 B1 | 5/2003 | Lynch et al. | |
| 6,594,354 B1 | 7/2003 | Kelly | |
| 6,603,847 B1 * | 8/2003 | Griffith | H04M 3/523 379/201.02 |
| 6,611,590 B1 | 8/2003 | Lu et al. | |
| 6,631,271 B1 | 10/2003 | Logan | |
| 6,633,848 B1 | 10/2003 | Johnson et al. | |
| 6,658,104 B1 * | 12/2003 | Carrion | H04M 11/04 379/218.02 |
| 6,665,534 B1 * | 12/2003 | Conklin | H04M 3/436 455/417 |
| 6,674,403 B2 | 1/2004 | Gray et al. | |
| 6,680,999 B1 | 1/2004 | Garcia | |
| 6,721,412 B1 | 4/2004 | Youngs | |
| 6,727,818 B1 | 4/2004 | Wildman et al. | |
| 6,751,307 B2 | 6/2004 | McAlinden | |
| 6,771,173 B1 | 8/2004 | Clayton et al. | |
| 6,785,380 B2 | 8/2004 | Ribera | |
| 6,810,429 B1 | 10/2004 | Walsh et al. | |
| 6,859,649 B1 | 2/2005 | Denenberg et al. | |
| 6,888,927 B1 | 5/2005 | Cruickshank et al. | |
| 6,892,083 B2 | 5/2005 | Shostak | |
| 6,895,558 B1 | 5/2005 | Loveland | |
| 6,898,625 B2 | 5/2005 | Henry et al. | |
| 6,970,548 B2 | 11/2005 | Pines et al. | |
| 6,970,706 B2 * | 11/2005 | Siemens | H04W 84/16 370/351 |
| 6,996,406 B2 | 2/2006 | Lection et al. | |
| 7,023,837 B1 * | 4/2006 | Srinivasan | H04L 12/2856 370/352 |
| 7,023,979 B1 | 4/2006 | Wu et al. | |
| 7,024,184 B2 * | 4/2006 | Erb | H04W 4/16 455/415 |
| 7,069,018 B1 * | 6/2006 | Granstam | H04M 1/663 455/414.1 |
| 7,136,475 B1 | 11/2006 | Rogers et al. | |
| 7,167,553 B2 | 1/2007 | Shaffer et al. | |
| 7,191,221 B2 | 3/2007 | Schatz et al. | |
| 7,248,688 B2 | 7/2007 | Wellons et al. | |
| 7,327,756 B2 | 2/2008 | Hamlin | |
| 7,366,522 B2 * | 4/2008 | Thomas | H04W 4/02 340/539.13 |
| 7,376,470 B2 | 5/2008 | Tanaka | |
| 7,376,704 B2 | 5/2008 | Wellons et al. | |
| 7,644,169 B2 | 1/2010 | Cleghorn et al. | |
| 7,672,003 B2 | 3/2010 | Dowling et al. | |
| 7,782,907 B2 | 8/2010 | Agrawal | |
| 7,995,742 B2 * | 8/2011 | Lenard | H04M 3/42374 379/265.09 |
| 8,326,651 B2 | 12/2012 | McLaren et al. | |
| 8,942,367 B1 | 1/2015 | Croak | |
| 9,154,619 B2 * | 10/2015 | Jorasch | H04M 1/2535 |
| 2002/0004727 A1 | 1/2002 | Knaus et al. | |
| 2002/0010679 A1 | 1/2002 | Felsher | |
| 2002/0016818 A1 | 2/2002 | Kirani et al. | |
| 2002/0049615 A1 | 4/2002 | Huber | |
| 2002/0055917 A1 | 5/2002 | Muraca | |
| 2002/0055967 A1 | 5/2002 | Coussement | |
| 2002/0065758 A1 | 5/2002 | Henley | |
| 2002/0068575 A1 | 6/2002 | Agrawal et al. | |
| 2002/0076026 A1 | 6/2002 | Batten | |
| 2002/0080416 A1 | 6/2002 | Quine | |
| 2002/0106071 A1 | 8/2002 | Uppaluru et al. | |
| 2002/0112008 A1 | 8/2002 | Christenson et al. | |
| 2002/0114278 A1 | 8/2002 | Coussement | |
| 2002/0120687 A1 | 8/2002 | Diacakis et al. | |
| 2002/0143876 A1 | 10/2002 | Boyer et al. | |
| 2002/0144154 A1 | 10/2002 | Tomkow | |
| 2002/0163572 A1 | 11/2002 | Center, Jr. et al. | |
| 2002/0167935 A1 | 11/2002 | Nabkel et al. | |
| 2002/0188689 A1 | 12/2002 | Michael | |
| 2003/0009530 A1 | 1/2003 | Philonenko et al. | |
| 2003/0028399 A1 | 2/2003 | Davis et al. | |
| 2003/0055684 A1 | 3/2003 | Jaskolski et al. | |
| 2003/0058838 A1 | 3/2003 | Wengrovitz | |
| 2003/0065738 A1 | 4/2003 | Yang | |
| 2003/0135565 A1 | 7/2003 | Estrada | |
| 2003/0135624 A1 | 7/2003 | McKinnon et al. | |
| 2003/0179743 A1 | 9/2003 | Bosik et al. | |
| 2003/0191685 A1 | 10/2003 | Reese | |
| 2003/0200226 A1 | 10/2003 | Wells et al. | |
| 2003/0208543 A1 | 11/2003 | Enete et al. | |
| 2004/0028208 A1 * | 2/2004 | Carnazza | H04M 3/42229 379/221.01 |
| 2004/0057569 A1 | 3/2004 | Busey et al. | |
| 2004/0059603 A1 | 3/2004 | Brown, Jr. et al. | |
| 2004/0117215 A1 | 6/2004 | Marchosky | |
| 2004/0125938 A1 | 7/2004 | Turcan et al. | |
| 2004/0153511 A1 | 8/2004 | Maynard et al. | |
| 2004/0193449 A1 | 9/2004 | Wildman et al. | |

(56) References Cited

U.S. PATENT DOCUMENTS

| | | |
|---|---|---|
| 2004/0203906 A1 | 10/2004 | Kato et al. |
| 2004/0220830 A1 | 11/2004 | Moreton et al. |
| 2004/0249776 A1 | 12/2004 | Horvitz et al. |
| 2005/0027788 A1 | 2/2005 | Koopmans et al. |
| 2005/0035862 A1 | 2/2005 | Wildman et al. |
| 2005/0065817 A1 | 3/2005 | Mihai et al. |
| 2005/0097176 A1 | 5/2005 | Schatz et al. |
| 2005/0154792 A1 | 7/2005 | Deryugin et al. |
| 2005/0209891 A1 | 9/2005 | Jacobus et al. |
| 2007/0037605 A1 | 2/2007 | Logan |
| 2012/0106728 A1* | 5/2012 | Ghaffari ............ H04M 3/42272 379/211.02 |
| 2014/0016768 A1 | 1/2014 | Turcan |

* cited by examiner

METHODS, SYSTEMS, AND PRODUCTS FOR ROUTING COMMUNICATIONS

CROSS-REFERENCE TO RELATED APPLICATIONS

This application is a continuation of and claims priority to U.S. patent application Ser. No. 14/291,036 filed May 30, 2014 and since issued as U.S. Pat. No. 9,363,376, by Turcan et al., entitled "Methods, Systems, and Products for Routing Communications", which is a continuation of U.S. patent application Ser. No. 12/617,753 filed Nov. 13, 2009 and since issued as U.S. Pat. No. 8,767,943, which is a continuation of U.S. patent application Ser. No. 10/335,113 filed Dec. 31, 2002 and since issued as U.S. Pat. No. 7,620,170. The contents of each of the foregoing is/are hereby incorporated by reference into this application as if set forth herein in full.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but the copyright owner otherwise reserves all copyrights whatsoever.

BACKGROUND OF THE DISCLOSURE

This invention generally relates to computer networks and to telephony. More particularly, this invention is directed to methods and systems for more efficient and effective communication and processing of electronic data in a call management and contact center system.

Large businesses commonly service customers through call management and contact centers (herein after referred to as a "call center"). These call centers are staffed with support agents, interactive voice response recordings, and/or information systems to process customer inquiries across numerous communications devices and network infrastructures. Each week, hundreds, if not thousands or more, of incoming communications (including calls, emails, faxes, letters, and other communications) and associated data are received, accessed, and/or managed by the call center. The agent (or an automated call forwarding system) may forward/transfer the incoming communication and/or associated data to an extension of a designated party who can respond to the customer. The extension is typically associated with a physical location of a phone, such as a phone in the designated party's office or a particular location in a building. Oftentimes, the designated party is unavailable to receive the incoming communication and/or associated data because the designated party is away from the phone or because the phone cannot display or otherwise provide the associated data. For example, if the designated party is a doctor working in a large hospital, the doctor may be located at numerous locations throughout the day, such as in-service patient floors for rounds and/or emergencies, conference rooms for meetings, and clinic rooms for appointments/consultation. Thus, the doctor travels to multiple locations at different times throughout the day as inpatient service loads, meeting times, clinic schedule changes, and other changes make it difficult to have a predictable schedule and location. While most doctors carry paging devices, these paging devices tend to have limited service areas that restrict communications outside of a geographic area and limited functionality that restricts an incoming communication to a short text message such as a phone number. These paging devices also do not transmit communications and/or data back to the call center such as confirmations that the incoming communication was reviewed, location of the paging device (e.g., paging device of Dr. Roberts is located on $3^{rd}$ floor/ICU section of Hawthorn building), and so on. Still further, most business people today tend to carry multiple communications devices, such as a pager, personal digital assistant (PDA), and cell phone. However, the call center of a business does not leverage the multiple communications devices of a designated party because each of these communications devices is customized in terms of software, hardware, and network configuration. For example, the PDA and the cell phone have different software applications, data processing, storage, management, and communications systems.

As discussed above, one of the biggest bathers facing a call center is locating and accessing multiple communications devices utilized by the staff of the call center. In addition, the incoming communications and associated data of the call center must be in a format that can easily be exchanged or otherwise shared with each communications device. For example, if the agent wants to share contact information (e.g., name, phone numbers, addresses, etc.) with a cell phone and a pager of a designated party, then the agent typically must enter this information twice—once on a platform communicating with the cell phone and once on a platform communicating with the pager. Another barrier is providing the incoming communication and/or associated data in a standardized or otherwise compatible data format, depending on functionality limitations of the communications device, so that each communications device has efficient and effective access to the information. For example, conventional wireless phones have limited functionality compared with personal computers (PC). Typically, wireless telephones provide limited contact information, such as a telephone listing by name rather than full address books and/or calendars. Additionally, conventional wireless telephones are unable to run application/software packages and may have limited capabilities for transmitting, receiving, and displaying video data.

To further complicate operations of the call center, most large businesses must work with several vendors who each provide only a portion of the required call management and contact center system. Further, these large businesses often do not have the technical staff to design, select, and integrate network(s), hardware and equipment, software, and/or develop customized applications. Even after a large business customer has purchased the required components, they have difficulty integrating these components into existing infrastructures, and most often, end up with several call centers that do not provide access to information and/or to staff across the entire enterprise. As a result, large businesses limp along with many different, non-integrated communications networks and call center systems.

Accordingly, large businesses need integrated call management and contact center systems and methods that can provide immediate access to resources (e.g., staff and data), improve operator productivity, increase customer satisfaction, and control costs. The integrated call management and contact center systems and methods must support various communications infrastructures to capitalize on emerging communications devices such as, for example, interactive pagers, on-site pagers, wireless phones, personal computers, etc. Consequently, the integrated call management and contact center systems and methods should enable sharing, transferring, and/or accessing staff and data over various communications devices while also complying with information system requirements of the business, such as security and fail-safe requirements.

BRIEF SUMMARY OF THE INVENTION

The aforementioned problems and others are solved by a dynamic computer telephony integration (CTI) complete customer contact center (hereinafter referred to as the "dynamic contact center"). The dynamic contact center comprises systems and methods that leverage the assets of a business' communications systems including internal telecommunications networks, information systems, data networks, and applications, of public telecommunications networks (e.g., public switched telephone network (PSTN) or mobile telecommunications switching office (MTSO)), of public data networks (e.g., Internet), and/or of various communications devices of a designated party affiliated with the business in order to facilitate improved access, sharing, notification, and/or management of incoming calls and associated data of the business' call center. Some advantages of the dynamic contact center include faster access to staff and data, ability to communicate incoming calls and data to staff over a variety of communications devices, less operator/agent intervention, and increased emergency recovery capabilities.

An embodiment of this invention describes a computer telephony integration (CTI) system having a private branch exchange (PBX) or other similar system for connecting a plurality of agent stations with at least one telephone line. Typically, the agent station includes a personal computer and/or a telephone that the agent uses to answer, respond to, and/or transfer incoming communications (including associated data) to a call center. The system includes detection means for detecting the incoming communication, an input/output processor to input and to output data associated with the incoming communication, a communications interface for communicating the incoming communication and/or associated data with a communications device associated with a designated party (i.e., staff) of the call center, a memory device for storing the data, a processor communicating with the memory device, and a call center application for managing a communications profile. The processor selects data stored in the memory device based upon the communications profile, and typically includes information about (1) customer data associated with the incoming communication, (2) data associated with the designated party, (3) data associated with at least one of services, products, and business operations affiliated with the call center, (4) data associated with network configuration, (5) data associated with a configuration profile of the communications device, and (6) data associated with communications systems of the call center. Further, the communications interface may include means for providing messaging delivery means for delivering and confirming receipt/review of the incoming communication (including associated data). In various embodiments, the communications device may be a transmitter, a telephone, an intercom communications device, a personal computer, a wireless communications device, an on-site pager, a mobile phone, a wireless phone, a WAP phone, an IP phone, a satellite phone, a computer, a modem, a pager, a digital music device, a digital recording device, a personal digital assistant, an interactive television, a digital signal processor, a Global Positioning System device, and other similar communications devices.

In another embodiment, the system further includes status means for communicating a status of the communications device associated with the designated party of the call center to the call center application. Typically, the status provides information about availability and/or location of the designated party, availability and/or location of the communications device, messaging delivery capabilities of the communications device, and/or messaging delivery confirmation to the communications device. Further, the system may include status processing means that use the status to provide routing instructions to the communications interface for connecting the incoming call and/or associated data with the communications device.

Another embodiment describes a method for communicating an incoming communication to a private branch exchange (PBX) or other similar system that connects a plurality of agent stations with at least one telephone line, associating a communications profile with the incoming communication, accessing a communications network of the call center to determine a status, and based upon the status, communicating the incoming communication and/or data to the communications device.

Still, a further embodiment describes a network of interconnected communications devices associated with a call center, a rule-based application dataserver for managing the exchange of an incoming communication and/or associated data between an agent station of the call center and a communications device of a designated party affiliated with the call center, and an application program installed in the agent station. According to this embodiment, the application program allows an agent to manage a communications profile associated with (1) customer data associated with the incoming communication, (2) data associated with a designated party, (3) data associated with at least one of services, products, and business operations affiliated with a call center, (4) data associated with network configuration, (5) data associated with a configuration profile of a communications device associated with a designated party of the call center, and (6) data associated with communications systems of the call center.

BRIEF DESCRIPTION OF THE DRAWINGS

The above and other embodiments, objects, uses, advantages, and novel features of this invention are more clearly understood by reference to the following description taken in connection with the accompanying figures, wherein.

DETAILED DESCRIPTION OF THE DRAWINGS

Figure 1:
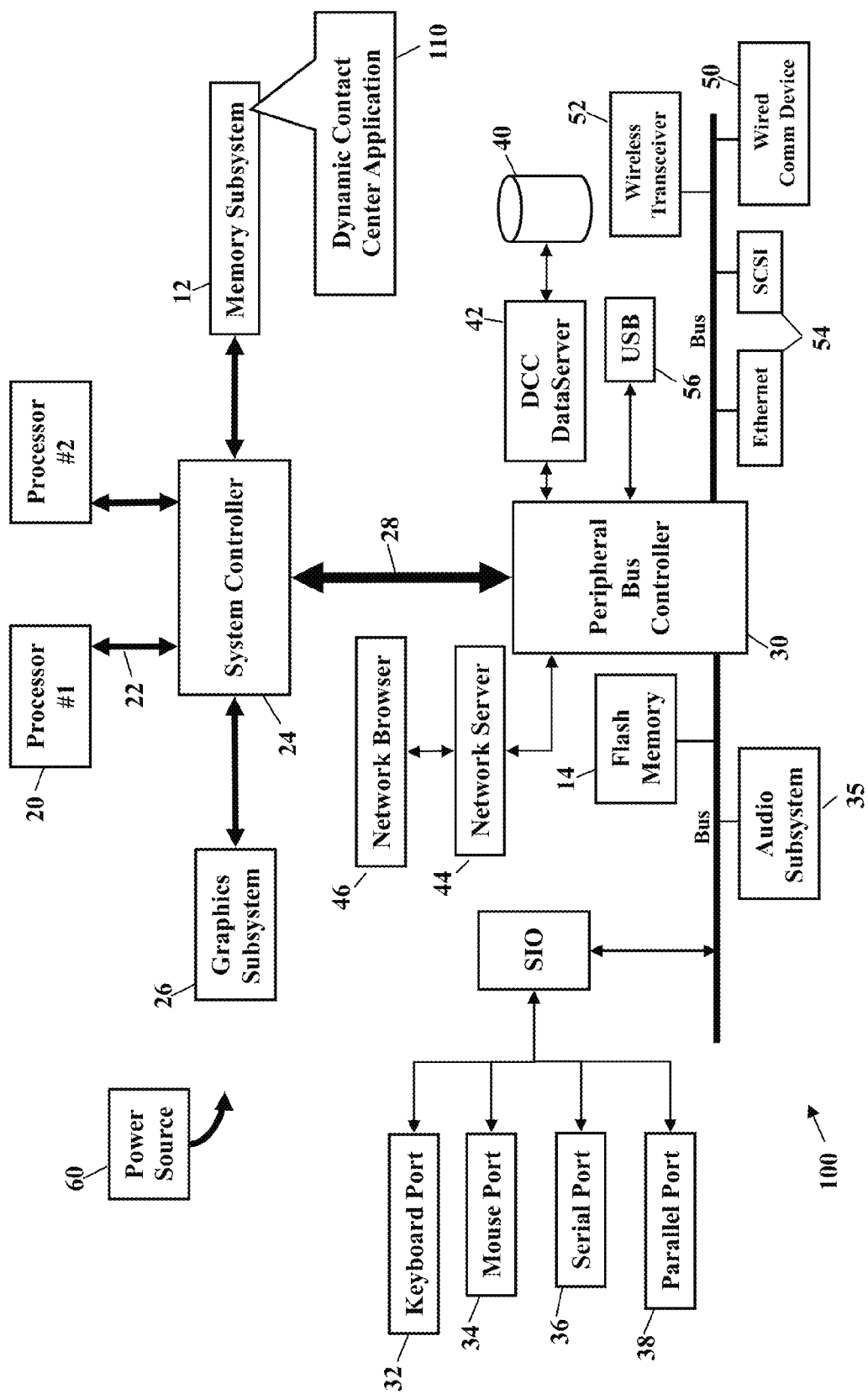
FIG. 1 is a block diagram showing of an exemplary Dynamic Contact Center (DCC) application operating in an agent station according to an embodiment of this invention.

This invention now will be described more fully hereinafter with reference to the accompanying drawings, in which exemplary embodiments are shown. This invention may, however, be embodied in many different forms and should not be construed as limited to the embodiments set forth herein; rather, these embodiments are provided so that this disclosure will be thorough and complete, and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

The aforementioned problems and others are solved by a dynamic computer telephony integration (CTI) complete customer contact center ("dynamic contact center"). The dynamic contact center comprises systems and methods that leverage the assets of a business' communications systems including internal telecommunications networks, information systems, data networks, and applications, of public telecommunications networks (e.g., public switched telephone network (PSTN) or mobile telecommunications switching office (MTSO)), of public data networks (e.g., Internet), and/or of various communications devices of a designated party affiliated with the business in order to facilitate improved access, sharing, notification, and/or management of incoming communications and associated data of the business' call center. As is apparent to one of ordinary skill in the art, the subject-specific group of the business may be tailored to any industry that seeks to leverage the assets of a dynamic contact center. Some advantages of the dynamic contact center include faster access to staff and data (remote and on-site), ability to communicate incoming calls and data to staff over a variety of communications devices, less operator/agent intervention, and increased emergency recovery capabilities. As used herein, the term "data" includes electronic information, such as information and/or files stored in a database, electronic messages such as email, notifications, replies, and/or other means of communicating electronic information between or among the business' communications system (including the agent station), the public telecommunications networks, the public data networks, and/or of various communications devices of a designated party.

Referring now to the figures, FIG. 1 is a block diagram showing a Dynamic Contact Center (DCC) Application 110 residing in an agent station 100. The DCC Application 110 operates within a system memory device. The DCC Application 110, for example, is shown residing in a memory subsystem 12. The DCC Application 110, however, could also reside in flash memory 14 and/or in a peripheral storage device, such as storage device 40 associated with a DCC dataserver 42. The agent station 100 also has one or more central processors 20 executing an operating system. The operating system, as is well known, has a set of instructions that control the internal functions of the agent station 100. A system bus 22 communicates signals, such as data signals, control signals, and address signals, between the central processors 20 and a system controller 24 (typically called a "Northbridge"). The system controller 24 provides a bridging function between the one or more central processors 20, a graphics subsystem 26, the memory subsystem 12, and a PCI (Peripheral Controller Interface) bus 28. The PCI bus 28 is controlled by a Peripheral Bus Controller 30. The Peripheral Bus Controller 30 (typically called a "Southbridge") is an integrated circuit that serves as an input/output hub for various peripheral ports. These peripheral ports could include, for example, a keyboard port 32, a mouse port 34, a serial port 36 and/or a parallel port 38. Additionally, these peripheral ports would allow the agent station to communicate with a variety of communications devices through ports 54 (such as SCSI or Ethernet), Wireless Transceiver 52 (using the IEEE Wireless standard 802.11 and Infrared), and Wired Comm Device Port 50 (such as modem V90+ and compact flash slots). The Peripheral Bus Controller 30 could also include an audio subsystem 35. Additionally, the agent station may include a network server 44 operating with a network browser 46. The DCC dataserver 42, the network server 44, and the network browser 46 may be stand alone or integrated components. Still further, the agent station 100 may include a power source 60, such as a rechargeable battery to provide power and allow the agent station 100 to be portable. The power source 60 may additionally or alternatively include an alternating current (AC) power source or power converter.

The processor 20 is typically a microprocessor. Advanced Micro Devices, Inc., for example, manufactures a full line of microprocessors, such as the ATHLON™ (ATHLON™ is a trademark of Advanced Micro Devices, Inc., One AMD Place, P.O. Box 3453, Sunnyvale, Calif. 94088-3453, 408.732.2400, 800.538.8450, www.amd.com). Sun Microsystems also designs and manufactures microprocessors (Sun Microsystems, Inc., 901 San Antonio Road, Palo Alto Calif. 94303, www.sun.com). The Intel Corporation manufactures microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com).

The preferred operating system is a LINUX® or a RED HAT® LINUX-based system (LINUX® is a registered trademark of Linus Torvalds and RED HAT® is a registered trademark of Red Hat, Inc., Research Triangle Park, N.C., 1-888-733-4281, www.redhat.com). Other operating systems, however, may be suitable. Such other operating systems would include a UNIX®-based system (UNIX® is a registered trademark of The Open Group, 44 Montgomery Street, Suite 960, San Francisco, Calif. 94104, 415.374.8280, www.opengroup.org). and Mac® OS (Mac® is a registered trademark of Apple Computer, Inc., 1 Infinite Loop, Cupertino, Calif. 95014, 408.996.1010, www.apple.com). Another operating system would include DOS-based systems. WINDOWS® and WINDOWS NT® are common examples of DOS-based systems (WINDOWS® and WINDOWS NT® are registered trademarks of Microsoft Corporation, One Microsoft Way, Redmond Wash. 98052-6399, 425.882.8080, www.Microsoft.com).

The system memory device (shown as memory subsystem 12, flash memory 14, or peripheral storage device 40) may also contain one or more application programs. For example, an application program may cooperate with the operating system and with a video display unit (via the serial port 36 and/or the parallel port 38) to provide a Graphical User Interface (GUI) display for the DCC Application 110 (e.g., GUI displays for a staff directory, a work profile of a designated party, a messaging screen for inputting a message and/or associated data, and a communications profile associated with the work profile, status, and/or business requirements). The GUI typically includes a combination of signals communicated along the keyboard port 32 and the mouse port 34. The GUI provides a convenient visual and/or audible interface with the user of the agent station 100. As is apparent to those of ordinary skill in the art, the selection and arrangement of the DCC Application 110 may be programmed over a variety of alternate mediums, such as, for example, a voice-activated menu prompt.

Typically, the DCC Application 110 is running on the workstation 100 when the incoming communication is detected at the PBX (or other similar system) by an automated call management and/or call routing system. The incoming communication is associated with initial customer data that triggers the DCC DataServer 42 to provide a communications profile of associated data along with the incoming communication to the workstation 100 (similar to decoding an ICLID signal for telecommunication special service features offered by telecommunication service providers). The DCC Application 110 allows an agent (or other staff or customers) of a call center to manage services provided by the dynamic contact center, such as: (1) accessing a staff directory including work profiles that provide up-to-date detailed information about a designated party, such as looking up the name of the designated party, a status of the designated party, and other information of the designated party (e.g., job title, job description, business department, business address, office hours, business associates such as secretaries, communications devices including personally owned/operated and employer affiliated, and routing addresses of the communications devices such as radio frequency identifiers, service node addresses, IP addresses, email addresses, and/or other electronic address information); (2) messaging options, such as taking, saving (e.g., email, voicemail, journal, etc.), retrieving, distributing (e.g., routing to one or more designated parties, delivery options including dates, times, priorities, etc.), and modifying a message; (3) issuing a query to determine the status of the designated party; (4) customizing the communications profile associated with DCC DataServer 42 including an access agent, a messaging agent, and a business requirements agent; (5) customizing presentation, features, and/or management of the incoming communication and/or associated data; and (6) controlling communications outside of the business' communications system, such as communications with a telecommunications network and/or a data network. For example, the agent (or the automatic call distributor using response rules received from an interactive response system) may interact with the Access Agent to control up-to-date staff directories, search for the designated party, use the work profile and/or the communications profile to launch a query to determine the status, receive the status, and communicate the status to a Messaging Agent to manage communications with the designated party.

In an embodiment, the DCC DataServer 42 has the ability to communicate with various networks, including internal and external telecommunications and/or data networks using appropriate protocols, such as standard transmission control protocol and Internet protocol (TCP/IP). The communications profiles stored by the DCC DataServer 42 provide increased security by allowing the business to internally control electronic data, utilize existing databases to add, delete, or otherwise change electronic data, and control how the business' communications system interacts with non-proprietary networks and communications devices, such as controlling routing instructions. Thus, DCC DataServer 42 functions as a computer server, database, and processor and is dedicated to managing DCC activity over the business' proprietary and non-proprietary networks.

The DCC Application 110 also allows the agent (or another authorized staff member) to control access, sharing, notification, routing, security, management, and/or additional processing of incoming communications and associated data. For example, DCC Application 110 allows the agent to control how the associated data is processed into the communications system of the business including (i) sending the data to a local storage device (such as local file server 216 shown in FIG. 1), or alternatively, to a remote storage device (such as a file server associated a the telecommunications service provider), (ii) archiving the data, (iii) encrypting the data, (iv) copying the data, and (v) associating the data with the communications profile. The DCC Application 110 may be downloaded from telecommunications network 204, data network 230, or provided on a storage media (e.g., diskette, CD-ROM, or installed by the computer system manufacturer) to install on the agent workstation 100 to enable, disable, and further control a variety of DCC Services. Still further, the DCC Application 110 allows the agent (or other staff) to customize presentation features, such as splitting a workstation screen into two viewing areas and presenting a video display of the incoming communication in one portion and presenting information associated with the Access Agent (e.g., staff directory) in the second portion.

Figure 2:
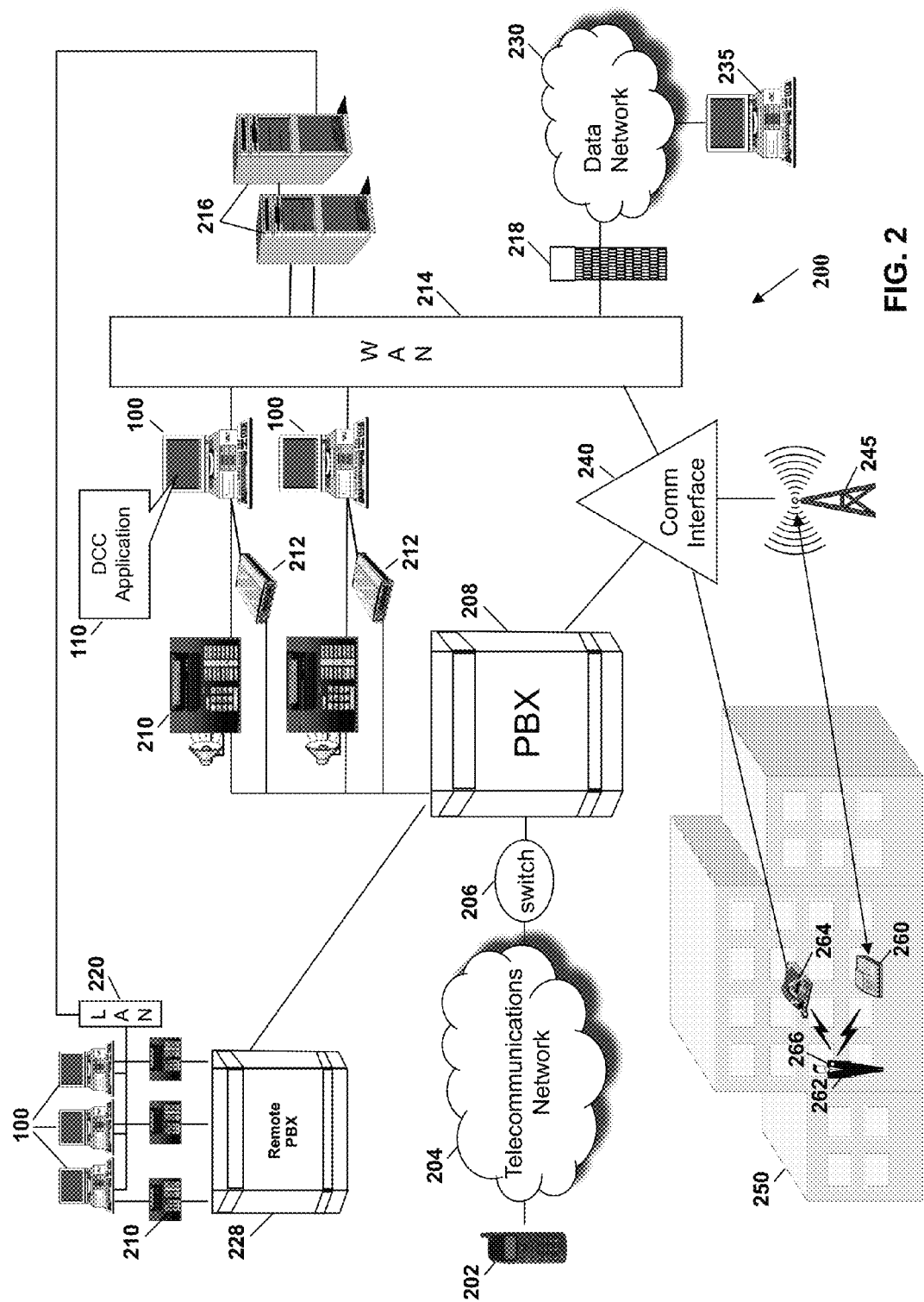
FIG. 2 is a schematic showing an exemplary operating environment for a dynamic contact center system that includes means for determining a status of a designated party and communicating with the designated party over a telephone and/or an intercom workstation according to an embodiment of this invention.

FIG. 2 is a schematic showing an exemplary operating environment for a dynamic contact center (DCC) 200. The DCC 200 includes a mobile telephone 202, a telecommunications network 204, a switch 206, a private branch exchange (PBX) 208, at least one telephone/voice workstation 210, at least one modem 212, at least one agent workstation 100, a dynamic contact center application 110, a wide area network 214, at least one file server 216, a firewall 218, a local area network 220, a remote PBX 228, a data network 230, a remote personal computer 235, a communications interface 240, a transceiver 245, a business facility 250, an intercom workstation 260, a designated party 262, an affiliated telephone 264, and a personal identification transmitter 266. The intercom workstation 260 is similar to traditional intercom systems; however, intercom workstation 260 may further include an audio subsystem (not shown) for broadcasting and receiving audio messages, a video subsystem (not shown), typically a liquid crystal display (LCD), for displaying images, a keyboard and/or mouse for inputting and/or otherwise selecting commands and/or data, and an internal transceiver (not shown) for receiving signals from personal identification transmitter 266 and for sending signals to either the transceiver 245 or to the communications interface 240 so that the designated party 262 can be located within the business facility 250.

Typically, a customer uses mobile phone 202 to place a call routed through telecommunication network 204 and switch 206 to the PBX 208 (to the called telephone number of the call center). Alternatively, the customer may use the personal computer 235 to gain access to the DCC 200 through data network 230. If so, firewall 218 screens and routes the incoming communication over the WAN 214. The incoming communication (e.g., incoming call) is usually detected by an automated answering system (or similar system for communications initiated by personal computer 235) that provides intelligent routing of the call. For example, the customer may hear a prerecorded message prompting the customer to make an initial routing selection, such as, for example "Press 1 to place an order," "Press 2 to speak with a customer service representative," "Press 3 for directions," "If you know the extension of the party (i.e., the designated party), please press * and the party's four digit extension," and so on. Thus, the incoming communication may be initially routed to an appropriate agent (including agents connected with remote PBX 228) or to the extension of the designated party 262 (as described later, this extension may also be associated with a status of the designated party and the incoming communication may be further routed based on the status to the communications device). If the incoming communication is routed to the agent, then the call may be sent to the telephone/voice workstation 210 and/or through modem 212 to agent workstation 100. Further, the incoming communication and initial routing instructions provide information about the call to the telephone/voice workstation 210 and/or the agent workstation 100. For example, if the calling telephone number of the customer is decoded and/or if the customer provides an account number in response to an inquiry from the automated answering system (or if the account number is associated with other information like the ICLID signal of the calling number), then when the agent workstation 100 receives the incoming communication, the DCC Application 110 may automatically associate, retrieve, and pull up associated customer information (typically stored on file server 216). After the agent answers the incoming call, the agent may gather additional information from the customer, associate other customer data, identify the designated party 262 who can further handle the customer's needs, determine a status of the designated party 262, and based upon an available status, transfer the incoming communication and associated data to an appropriate communications device, such as the workstation intercom 260 or the work telephone 264. If the status is unavailable, then the agent may alternatively route the incoming communication and/or associated data to a messaging system, such as voicemail or pager number messaging.

The agent and/or the automated answering system determines the status of the designated party 262 by associating availability data of the designated party 262, location data of the designated party 262, availability data of the communications device, location data of the communications device, messaging delivery capability data of the communications device, and/or messaging delivery confirmation data with the communications device. Typically, the designated party 262 programs in protocols or rules related to his/her availability, location, and communications device. For example, the designated party 262 may input his/her work schedule including meetings, breaks, office hours and so on. Similarly, the designated party 262 may input specific times of unavailability (e.g., do not disturb), such as, for example, when a surgeon is operating on a patient during a scheduled surgery. The location data of the designated party 262 and/or the communications device may also be used to determine a status of the designated party 262. In an embodiment, the designated party 262 wears a radio frequency (RF) transmitter 264 (or other means for identifying a location, such as, for example, a GPS transceiver or alternate location means) that transmits co-ordinates to nearby intercom workstation 260 in communication with transceiver 245 or that transmits co-ordinates directly to transceiver 245. The DCC Application 110 maps the co-ordinates to associate a location with the business facility 250 (e.g., 3$^{rd}$ floor Hawthorn Building, hallway section 4B). The location data may be further associated with the availability data of the designated party 262 to determine the status, such as whether the designated party 262 is available to receive the incoming communication. For example, if the designated party is located in a restroom, then the status of the designated party 262 is unavailable.

The availability data of the communications device may also be used to determine the status. For example, if the telephone 264 is off-hook, then the telephone 264 may be unavailable to receive the incoming communication and/or associated data. The telephone 264 may represent the extension of designated party 262 or, alternatively, telephone 264 may be associated with the designated party 262 through the communications profile and/or through determining the location of the designated party 262 and nearby facility communications devices (e.g., designated party is on 3.sup.rd floor Hawthorn building, section 4B and proximate communications devices to area 4B include the intercom 260 in section 4B and the telephone 264 in section 4C). In addition, the location of the communications device may be used to determine the status. For example, telephone 264 may be located in a conference room with an ongoing meeting, and therefore, the telephone 264 would be unavailable. Still further, the messaging delivery capability of the communications device may be used to determine the status. For example, if the intercom workstation 260 has the means to display video images and text files, then the intercom workstation 260 would be available to receive associated video and files with the incoming communication. Finally, messaging delivery confirmation capabilities of the communications device may be used to determine the status. For example, if the telephone 260 is capable of providing a dual tone multi frequency signal, then the telephone 260 would be available to transmit a confirmation signal from the designated party 262 indicating that the incoming communications and/or associated data (including messages) has been delivered and received by the designated party.

The incoming communication and/or associated data may include voice, video, text, and/or other electronic data that is routed over the wide area network 214 through the communications interface 240 (or alternate communications means as shown in FIGS. 8-11) to the available communications device (e.g., the intercom workstation 260 and/or telephone 264). The communications interface 240 not only communicates the incoming communication and/or associated data, but also formats and/or otherwise configures the incoming communication and/or associated data (including messages transcribed by an agent from the customer) for the communications device. For example, the data stored on file server 216 may need to be converted from a data format compatible with the agent station 100 (and/or for storage on the file server 216) to another data format compatible with the communications device. The data formats may include printed text formats, a voice data formats, a video data formats, a dual tone multi-frequency data formats, and a digital data format (e.g., ASCII). In addition, the communications interface 240 may further include message delivery means that provide confirmation, such as a symbol or short message, that the communications device of the designated party 262 has received the incoming communication and/or associated data. Thus, the communications interface 240 advises an agent when there is a problem or error communicating the incoming communication (including associated data) with the communications device. If there is a problem or error, then the agent may select an alternate communications device (if the status is available) to communicate the incoming communication.

Figure 3:
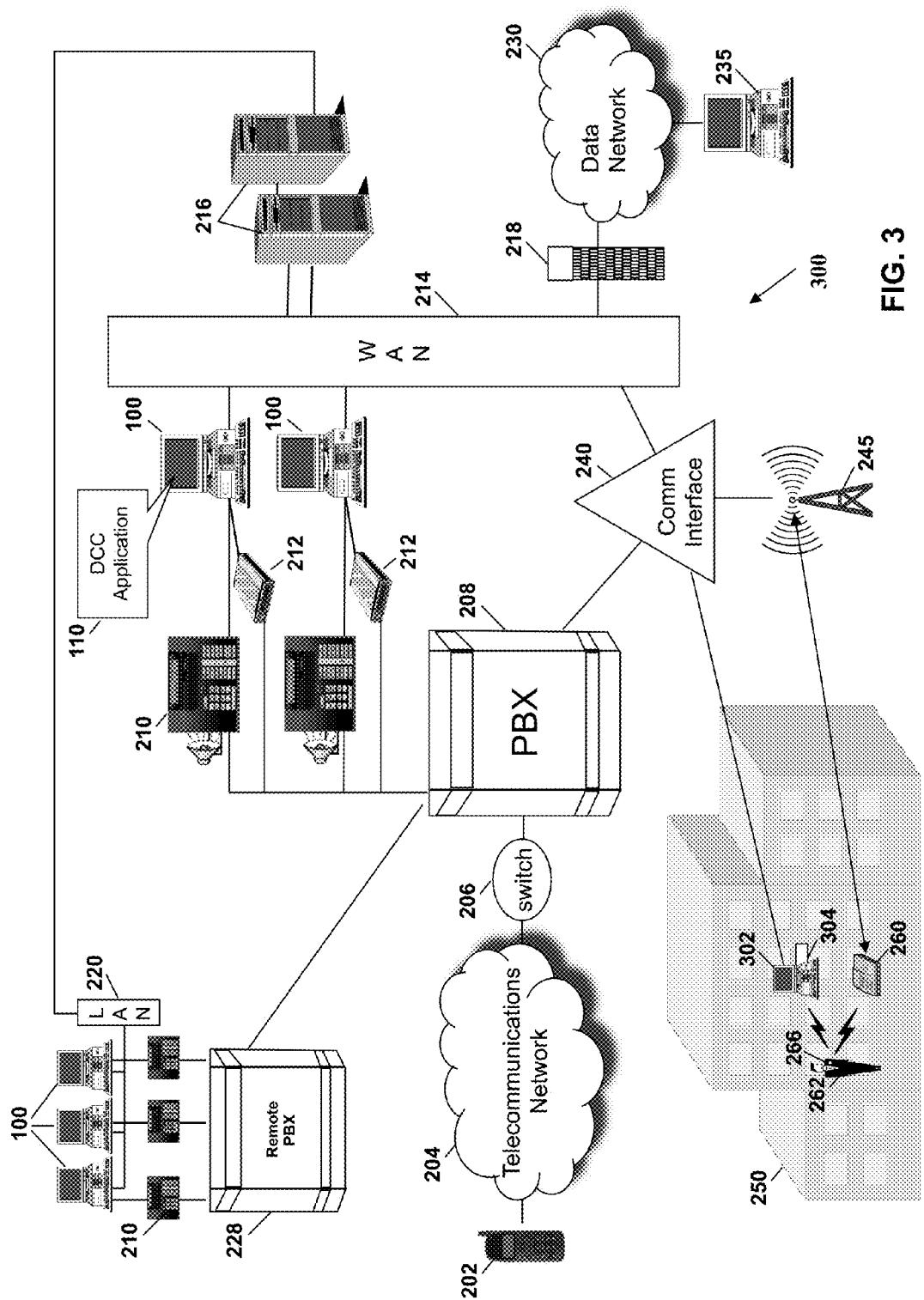
FIG. 3 is a schematic showing an exemplary operating environment for a dynamic contact center system that includes means for determining a status of a designated party and communicating with the designated party over a personal computer and/or an intercom workstation according to another embodiment of this invention.

FIG. 3 illustrates a dynamic contact center (DCC) 300 similar to the DCC 200 disclosed in FIG. 2. FIG. 3 further includes an affiliated computer workstation 302 coupled with the proprietary network of the communications system through communications interface 240. According to this embodiment, the agent (or a router of the automated answering system) receives the incoming communication and any associated data at his/her workstation 100, interacts with the customer, determines the status of the designated party 262, associates the status with the communications profile to select the nearby affiliated computer workstation 302, and provides the incoming communication and/or associated data to the workstation 302 for the designated party 262 to access. As discussed above, the communications interface 240 ensures that the incoming communication and/or associated data are formatted and/or otherwise configured for the workstation 302. Further, the incoming communication and/ or associated data routed to workstation 302 may be encrypted or otherwise secured so that only the designated party 262 has access. For example, workstation 302 may include a biometrics sensor 304, such as, for example, a fingerprint ID device. The biometrics sensor 304 may provide security features that prevent unauthorized parties from exploiting the incoming communication and/or associated data. The biometrics sensor 304 could also comprise retina recognition device and software, DNA/RNA recognition device and software, facial recognition device and software, speech recognition device and software, and/or scent recognition device and software.

Figure 4:
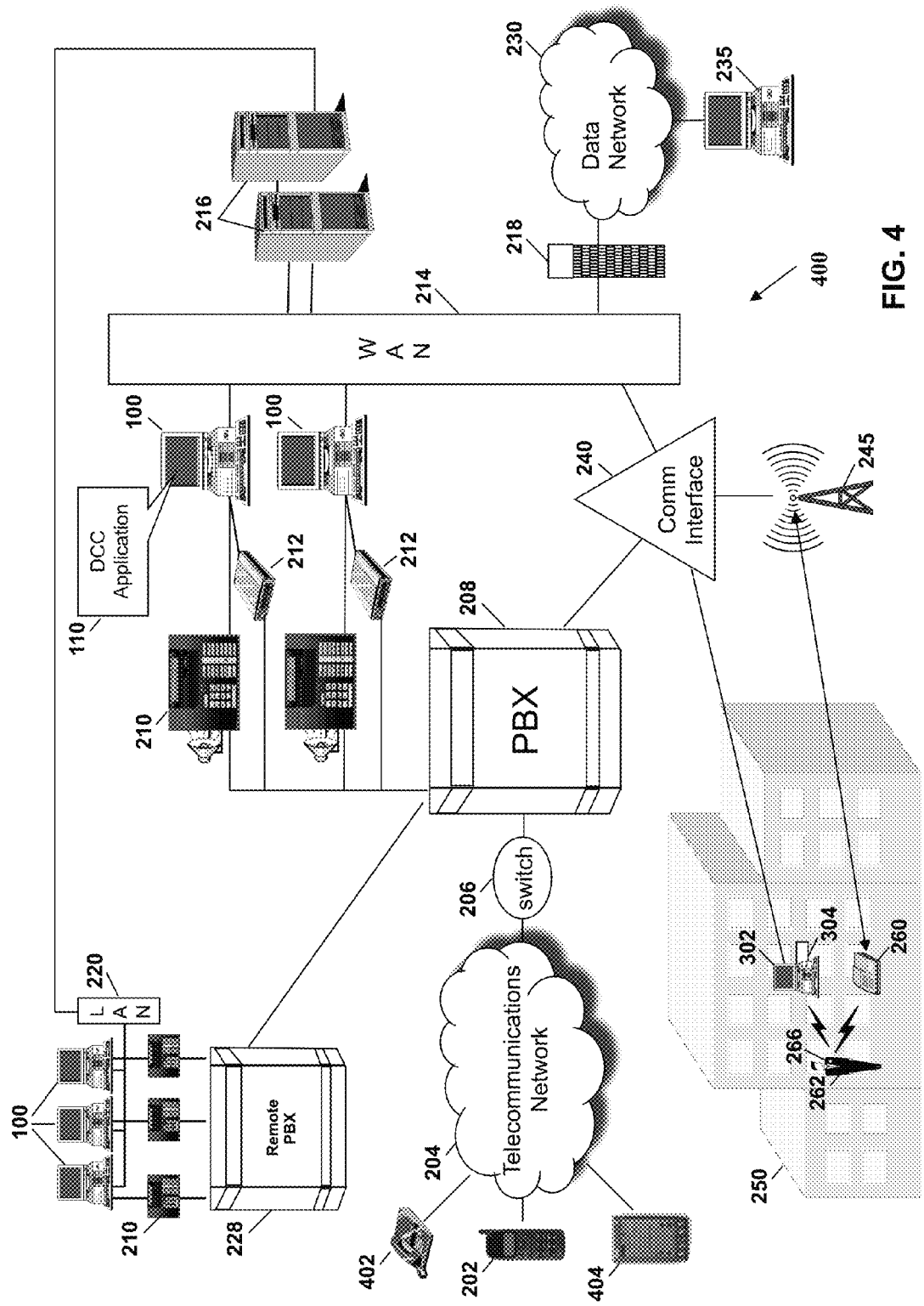
FIG. 4 is a schematic showing an exemplary operating environment for a dynamic contact center system that includes several customer communications devices for transceiving an incoming communication according to another embodiment of this invention.

FIG. 4 illustrates a dynamic contact center (DCC) 400 similar to the DCC 300 disclosed in FIG. 3. FIG. 4 further includes a POTS phone 402 and a personal digital assistant 404 to illustrate that the customer may use other wired and wireless communications devices to gain access to the PBX 208 through telecommunications network 204.

Figure 5:
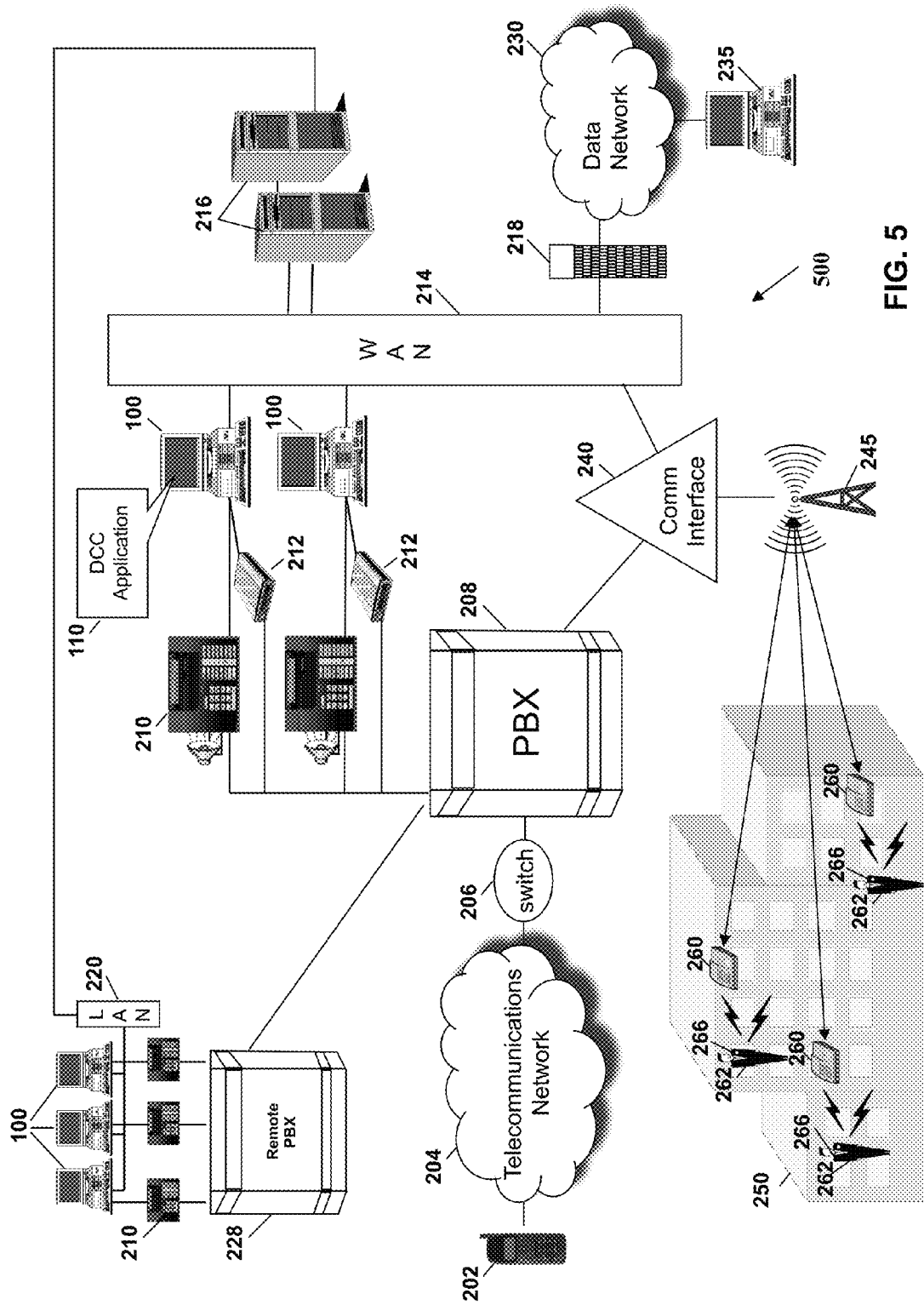
FIG. 5 is a schematic showing an exemplary operating environment for a dynamic contact center system that includes a plurality of intercom workstations for determining a status and communicating with a plurality of designated parties according to another embodiment of this invention.

FIG. 5 illustrates a dynamic contact center (DCC) 500 similar to the DCC 300 disclosed in FIG. 3. However, FIG. 5 further includes a plurality of intercom workstations 260 and a plurality of designated parties 262. According to this embodiment, the agent (or a router of the automated answering system) receives the incoming communication and any associated data at his/her workstation 100, interacts with the customer to identify multiple designated parties 262, determines the status of each of the designated parties 262, associates each status with one or more communications profiles to select a nearby intercom workstation 260 for each designated party 262, and provides the incoming communication and/or associated data to each intercom workstation 260 for each designated party 262 to access. The intercom workstations 260 are connected and associated so that the incoming communication and responses to the incoming communication are shared with the group of designated parties 262. Accordingly, this conference feature determines the status of each designated party 262 in a group and simultaneously provides the incoming communications and responses from each available communications device to the group. While not shown, each designated party 262 of the group could be accessed through alternate available communications devices (such as telephone 260 shown in FIG. 2, personal computer 302 shown in FIG. 3, pager 810, personal digital assistant (PDA) 812, interactive pager 814, and mobile phone 816 shown in FIG. 8, MP3 1002, digital signal processor 1004, modem 1006, and GPS 1008 shown in FIG. 10, and interactive television 1108 shown in FIG. 11). As discussed above, the communications interface ensures that the incoming communication and/or associated data are formatted and/or otherwise configured for each communications device.

Figure 6:
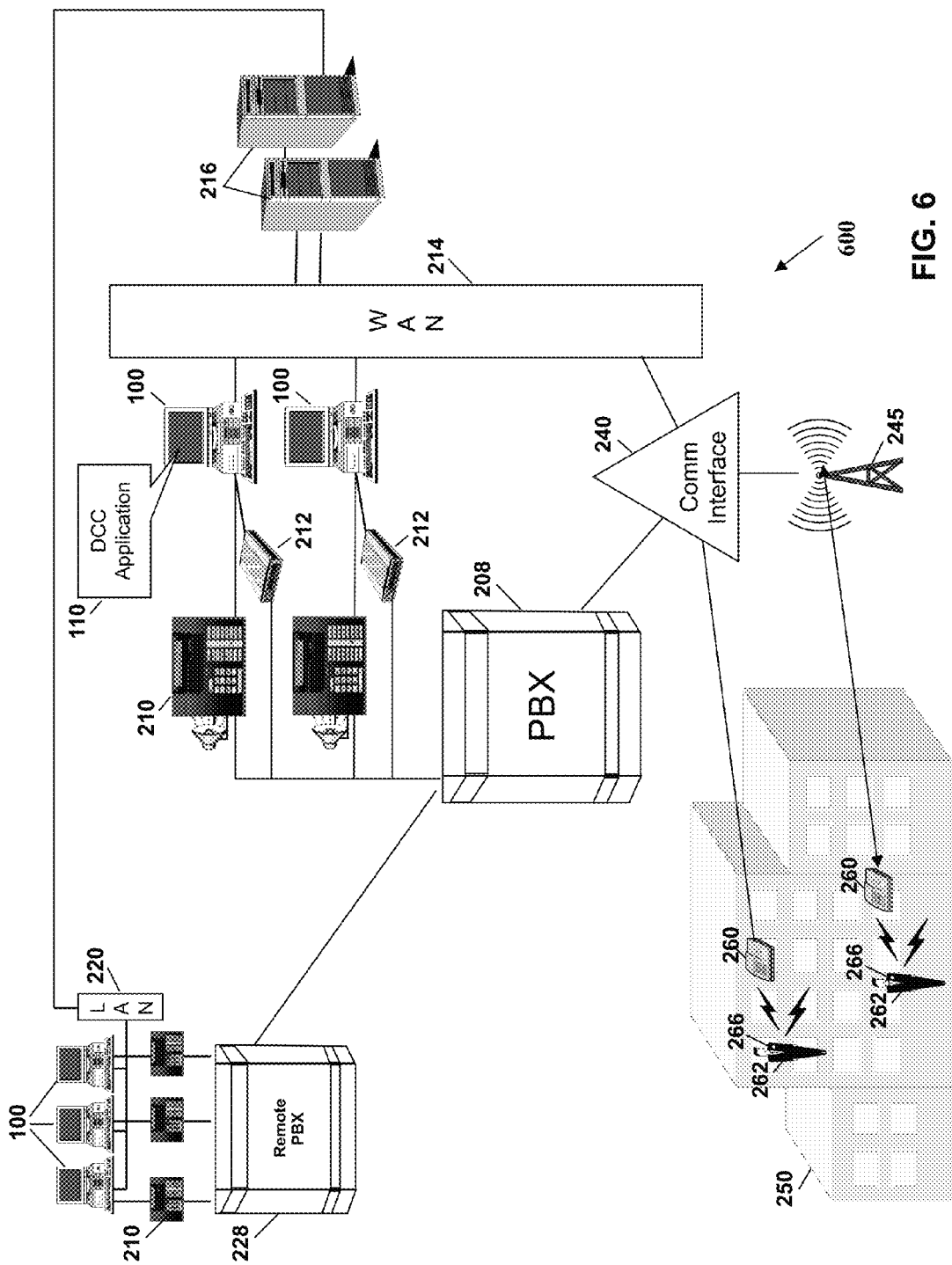
FIG. 6 is a schematic showing an exemplary operating environment for a dynamic contact center system that includes an internal business customer utilizing an intercom workstation for determining a status and communicating an internal communication with a designated party according to another embodiment of this invention.

FIG. 6 illustrates a dynamic contact center 600 similar to the DCC 500 of FIG. 5. However, according to the embodiment in FIG. 6, a staff member 602 initiates the incoming communication to the call center through intercom workstation 260. The agent (or automated answering system) receives the incoming communication and any associated data at his/her workstation 100, interacts with the staff member 602 to identify designated party 262, determines the status of the designated party 262, associates the status with the communications profile to select a nearby intercom workstation 260, and provides the incoming communication and/or associated data to the intercom workstation 260 for communications with the designated party 262. This embodiment illustrates the advantage of being able to internally use the DCC 600 for staff to more easily locate and communicate with highly mobile on-site staff (e.g., network administrators, doctors, car salesman, etc.).

Figure 7:
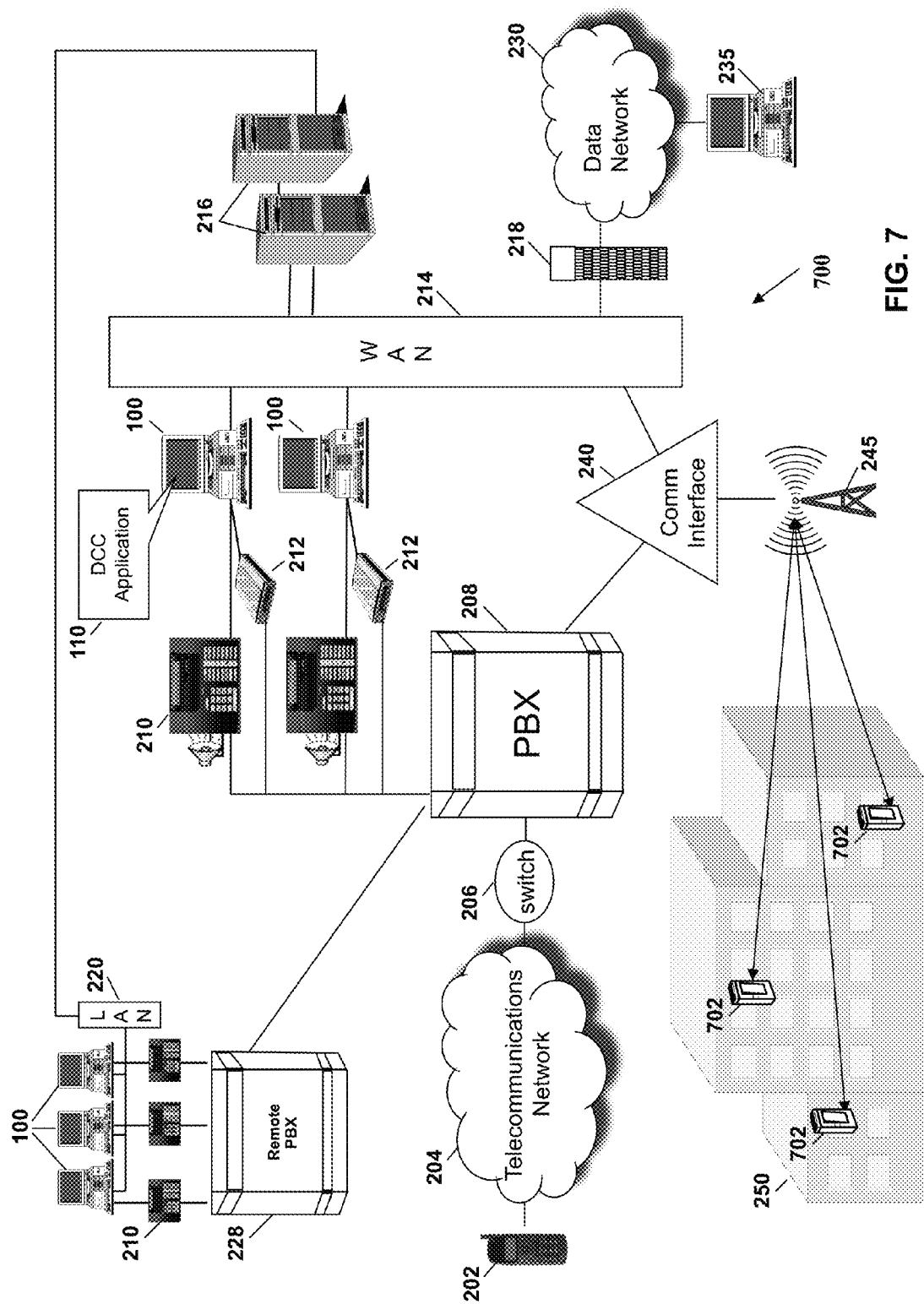
FIG. 7 is a schematic showing an exemplary operating environment for a dynamic contact center system that includes means for determining a status of a designated party having an on-site paging device according to another embodiment of this invention.

FIG. 7 illustrates a dynamic contact center (DCC) 700 similar to the DCC 500 disclosed in FIG. 5. However, FIG. 7 includes interactive, on-site messaging pagers 702 assigned to each designated party (not shown). According to this embodiment, the agent receives the incoming communication and any associated data at his/her workstation 100, interacts with the customer, determines the status of each designated party, associates the status with the communications profile to select the pager 702, and provides the incoming communication and/or associated data to the pager 702 for each designated party 262 to access. Since the interactive pagers 702 allow the designated party to respond to the incoming communication and/or data, this response can be shared with the other pagers 702 in the group.

Figure 8:
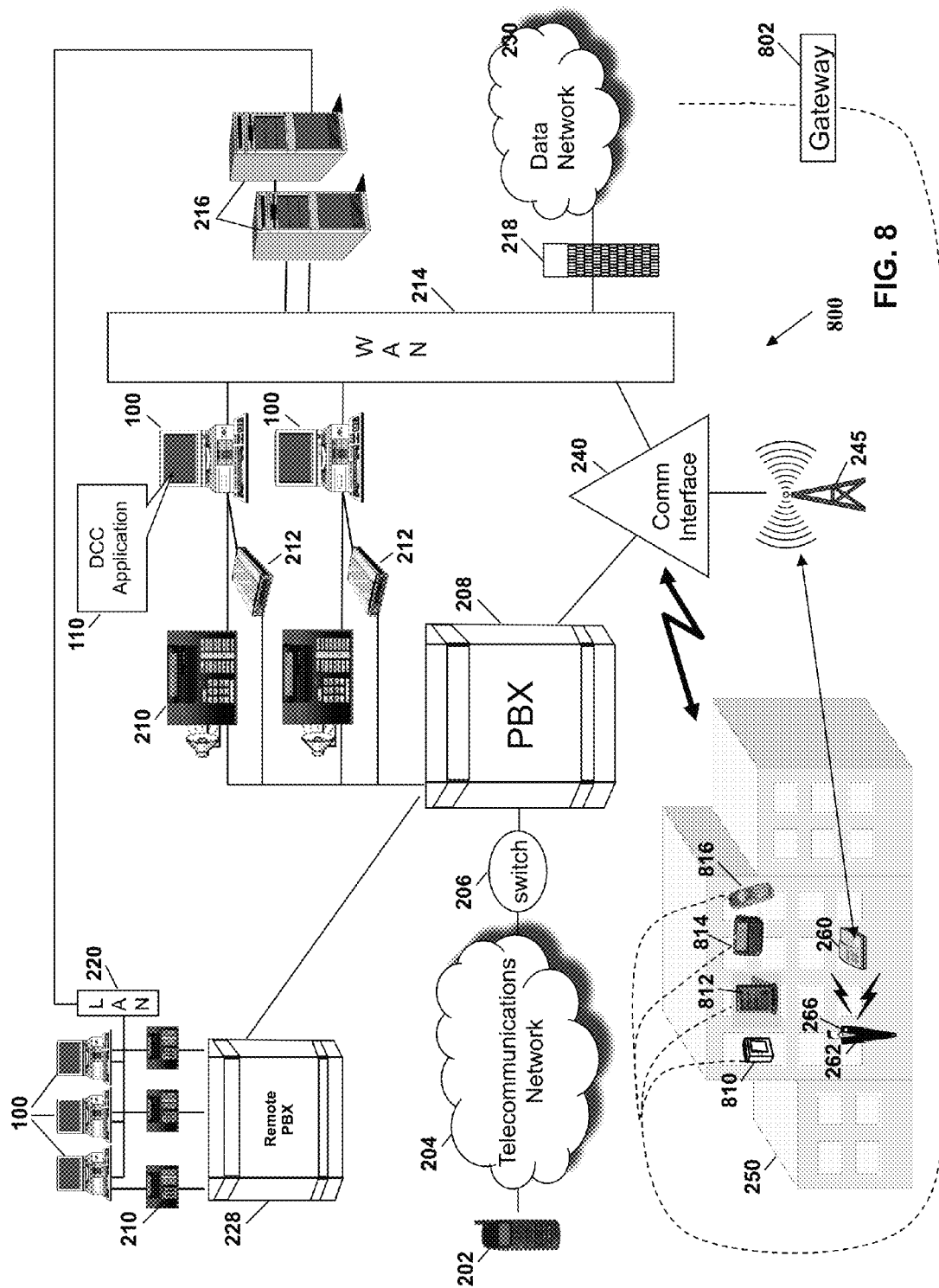
FIG. 8 is a schematic showing an exemplary operating environment for a dynamic contact center system that includes means for determining a status of a designated party and communicating with the designated party through an internal communications interface or a data network gateway to a wireless communications device according to another embodiment of this invention.
Figure 9:
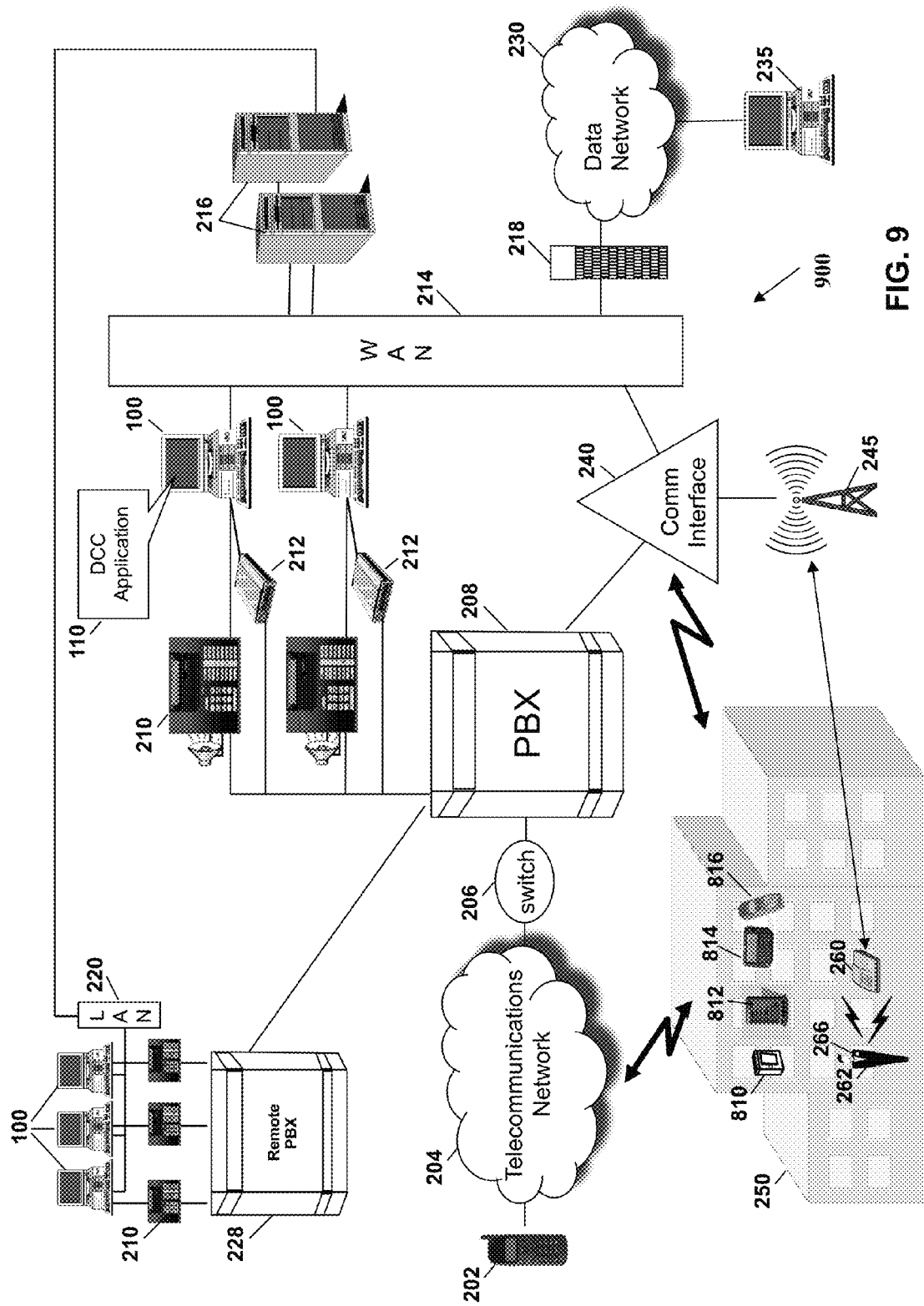
FIG. 9 is a schematic showing an exemplary operating environment for a dynamic contact center system that includes means for determining a status of a designated party and communicating with the designated party through an internal communications interface or a telecommunications network to a wireless communications device according to another embodiment of this invention.

FIG. 8 illustrates a dynamic contact center (DCC) 800 similar to the DCC 200 disclosed in FIG. 2. However, DCC 800 further includes a gateway 802, a pager 810, a PDA 812, an on-site, interactive pager 814, and a mobile phone 816. According to this embodiment, the agent receives the incoming communication and any associated data at his/her workstation 100, interacts with the customer to identify the designated party 262, determines the status of the designated party 262, associates the status with the communications profile to select one or more of the communications devices (including the intercom workstation 260, the pager 810, the PDA 812, the on-site, interactive pager 814, and the mobile phone 816) to communicate with, and provides the incoming communication and/or associated data to selected communications devices. As discussed above, the communications interface 240 ensures that the incoming communication, associated data, and/or responses are formatted and/or otherwise configured for each of the selected communications devices. Alternatively, the incoming communication and/or associated data may be routed through firewall 218 to the data network 230 and the gateway 802 to each of the selected communications devices. An advantage of using the gateway 802 is that the gateway 802 may be provided by a manufacturer of the selected communications device for specialized formatting and/or other configuration of the incoming communication and/or associated data for presentation by the selected communications device, such as formatting a picture for display by the liquid crystal display (LCD) screen of the PDA 812. Still further, as shown in FIG. 9, the incoming communication, associated data, and/or responses of a dynamic contact center 900 are routed through the telecommunications network 204 (including the public switched telephone network (PSTN) and mobile switched telephone network (MTSO)). An advantage of using the telecommunications network 204 is to leverage the assets of other affiliated data, up-to-date formatting and configuration programs (including sharing the costs of these systems with other customers of the telecommunications network), and increased range of accessing off-site staff (e.g., when a staff member is not located at the business facility 250, the transmitter 266 and/or alternate communications devices, such as the mobile phone 818, could provide the means to determine the location, and consequently the status, of the designated party).

Figure 10:
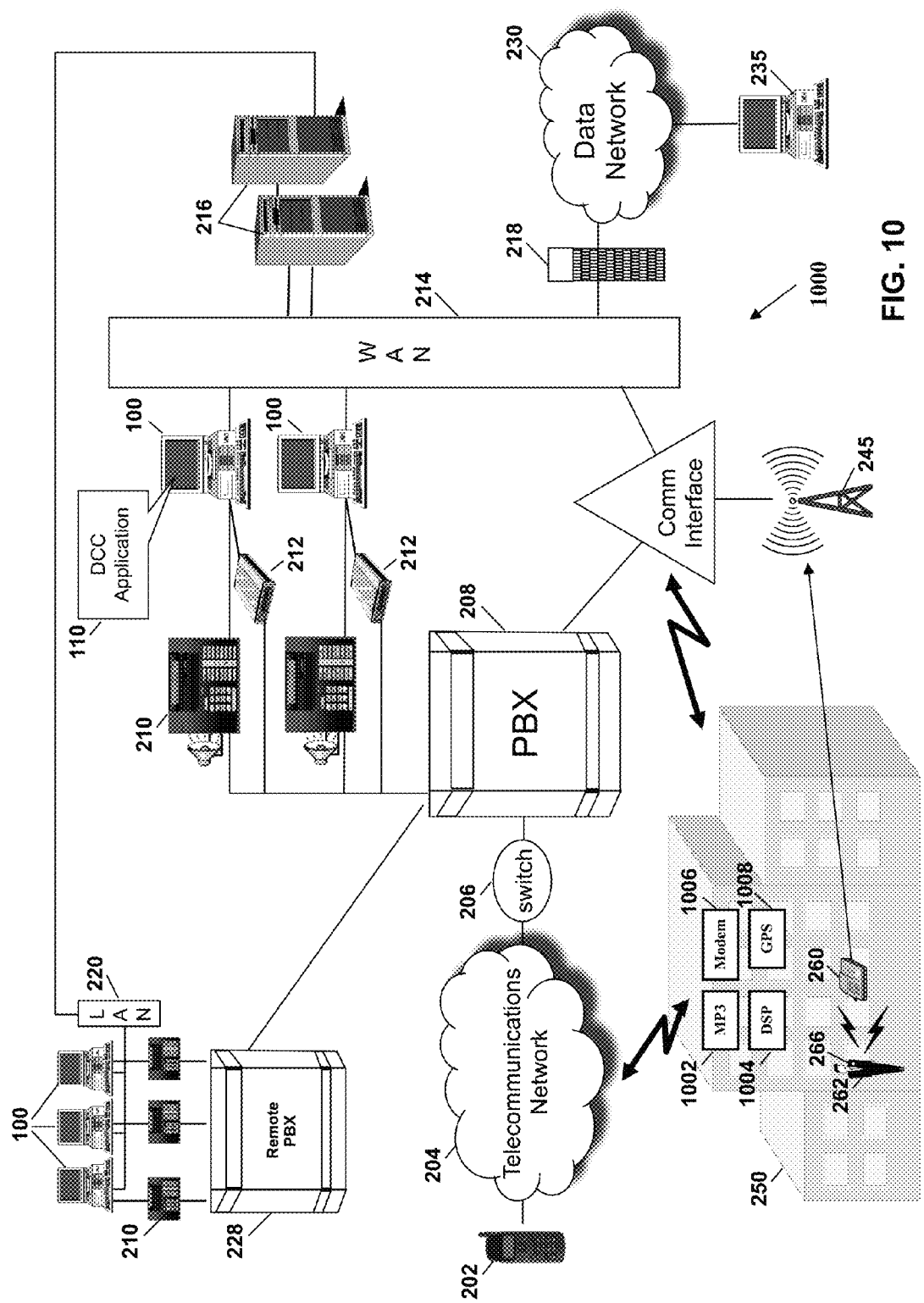
FIG. 10 is a schematic showing an exemplary operating environment for a dynamic contact center system that includes means for determining a status of a designated party and communicating with the designated party through an internal communications interface or a telecommunications network to alternate wireless communications device according to another embodiment of this invention.
Figure 11:
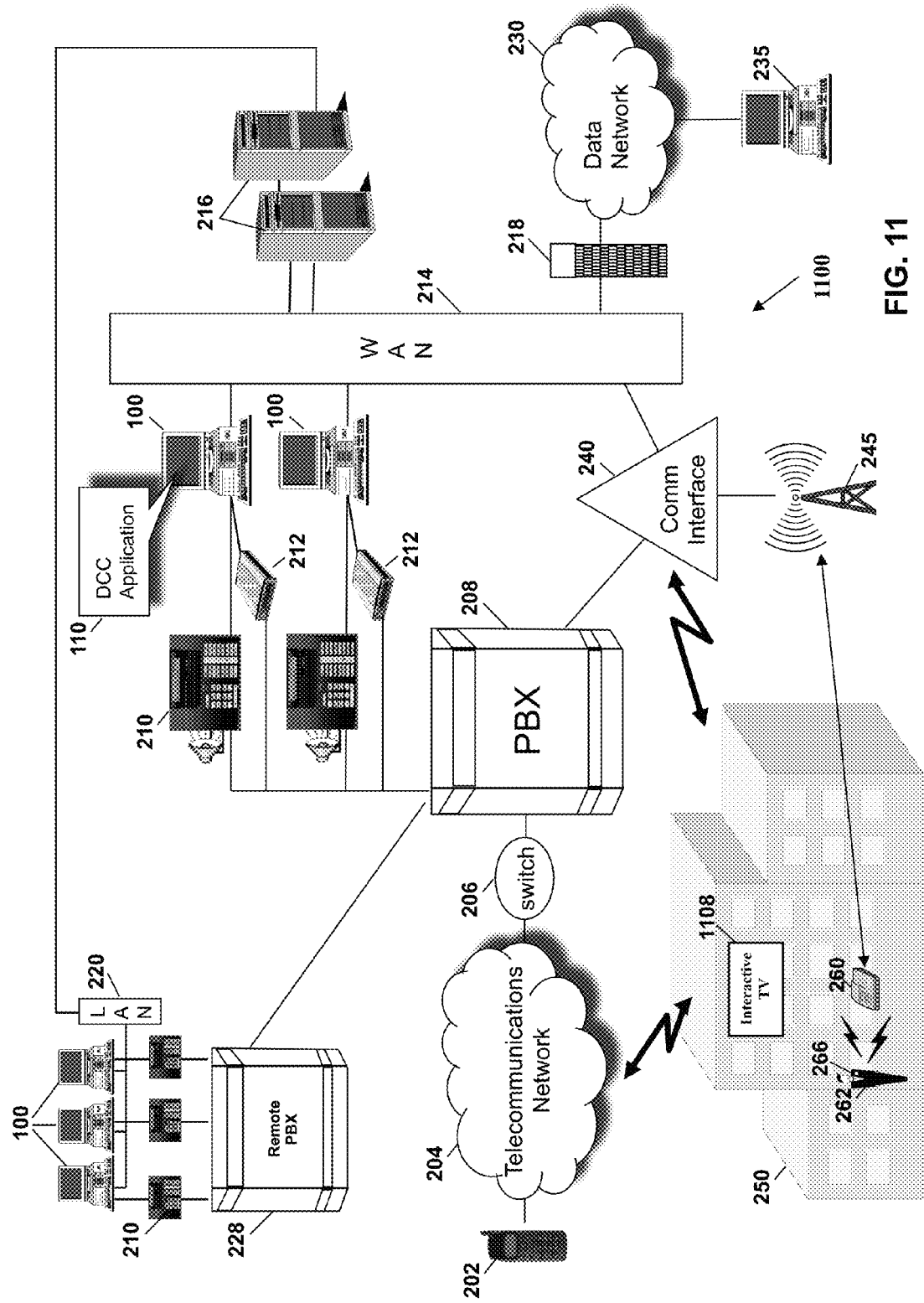
FIG. 11 is a schematic showing another exemplary operating environment with telecommunications and data networks for a dynamic contact center system that includes means for determining a status of a designated party and communicating with the designated party through an internal communications interface or a telecommunications network to another alternate wireless communications device according to an embodiment of this invention.

FIG. 10 illustrates a dynamic contact center (DCC) 1000 similar to the DCC 200 disclosed in FIG. 2. However, DCC 1000 further includes a MP3 1002, a digital signal processor 1004, a modem 1006, and a global positioning system (GPS) 1008. According to this embodiment, the agent receives the incoming communication and any associated data at his/her workstation 100, interacts with the customer to identify the designated party 262, determines the status of the designated party 262, associates the status with the communications profile to select one or more of the communications devices (including the intercom workstation 260, the MP3 1002, the digital signal processor 1004, the modem 1006, and the GPS 1008) to communicate with, and provides the incoming communication and/or associated data to selected communications devices. As discussed above, the communications interface 240 and/or the telecommunications network 204 ensures that the incoming communication, associated data, and/or responses are formatted and/or otherwise configured for each of the selected communications devices. Alternatively, the incoming communication, associated data, and/or responses of a dynamic contact center 1000 may be routed through firewall 218 to the data network 230 and a gateway (not shown) to each of the selected communications devices. Still further, according to the embodiment depicted in FIG. 11, a dynamic contact center 1100 includes an interactive television 1108 for communicating the incoming communication, associated data, and/or responses.

Regardless of the communications device used to communicate the incoming communication, associated data, and/or responses, this information may need to be formatted accordingly for the receiving communications device (including audio, text (e.g., ASCII), video, other digital formats, and combination thereof). Accordingly, the DCC DataServer 42 (via the communications profile) has the intelligence to associate the presentation capabilities of each of the receiving communications devices described in FIGS. 2-11 and to communicate the incoming communication (and associated data and response) to a communications interface (such as communications interface 240 or the gateway 802) for appropriate formatting. For example, if the alternate communications device uses the Wireless Application Protocol (WAP) technique, then the incoming communication and/or associated data are formatted using the Wireless Mark-up Language (WML). The Wireless Mark-up Language (WML) and the WAP technique are known and will not be further described. This is a description of a solution for a specific wireless protocol, such as WAP. This solution may be clearly extended to other wireless protocol, such as i-mode, VoiceXML (Voice eXtensible Markup Language), Dual Tone Multi-Frequency (DTMF), and other signaling means.

Figure 12:
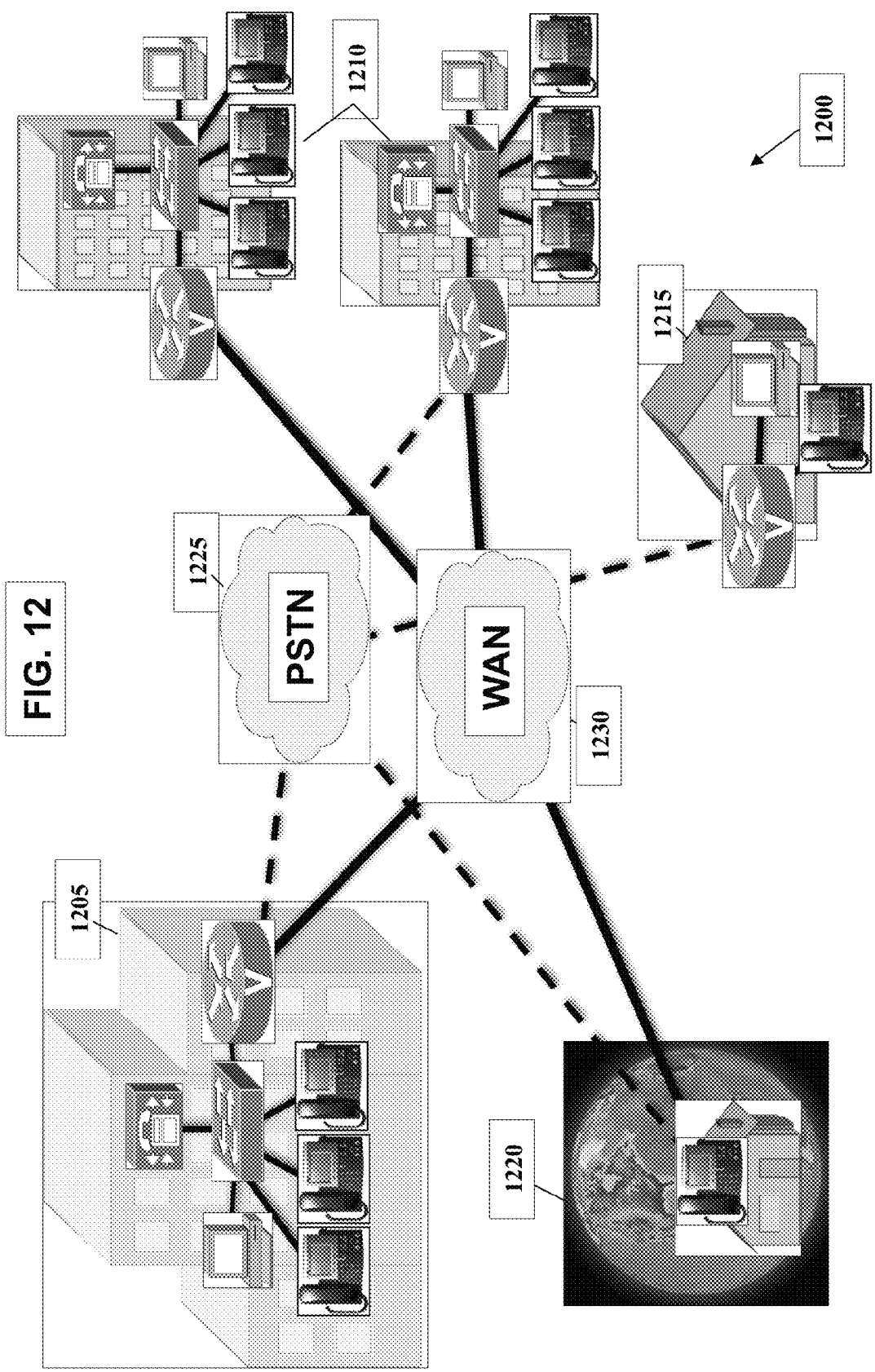
FIG. 12 is a schematic of an exemplary operating environment of a dynamic contact center system communicating with other systems over a telecommunications and/or data network.

Referring now to FIG. 12, a dynamic contact center (DCC) 1205 leverages the assets of a telecommunications network provided by PSTN 1225 and a wide area network 1230 to interconnect with remote business affiliated sites 1210, a remote authorized user 1215 (e.g., a staff member working remotely from home), and a customer and/or other third party 1220. Similar to the embodiments described above, the means of coupling the DCC 1205, the affiliated business sites 1210, the remote authorized user 1215, the customer/third party, the PSTN 1225 and the WAN 1230 include a variety of means, including optical transmission of electronic data, wireless transmission of electronic data, and/or fixed-wire transmission of electronic data (e.g., via a local loop of a telecommunications network to communicate electronic data). Fiber optic technologies, spectrum multiplexing (such as Dense Wave Division Multiplexing), Ethernet and Gigabit Ethernet services, and Digital Subscriber Lines (DSL) are just some examples of the coupling means. For example, the DCC 1200 may utilize SmartRing, AVVID & Frame Relay, and SS7 VC interconnections. Accordingly, the telecommunications network 204 may include Advanced Intelligent Network (AIN) componentry that may be programmed to control features of the DCC 1200, such as locating a designated party off-site and adding the off-site designated party to a group conference of the incoming communication, associated data, and/or responses (e.g., a mobile phone of the designated party could be located using fingerprinting or other techniques in the art, this location could be associated with a status, and the agent could process the incoming communication according to the status). The signaling between the DCC 1205, the affiliated business sites 1210, the remote authorized user 1215, the customer/third party, the PSTN 1225 including AIN componentry, and the WAN 1230 are well understood in by those of ordinary skill the art and will not be further described. Further, those of ordinary skill in the art will be able to apply the principles of this invention to their own communications systems including their network configurations which may differ substantially from the leveraging the telecommunications network (shown as reference numeral 1225 in FIG. 12, and alternatively, as reference numeral 204 in FIGS. 2-11), the WAN (shown as reference numeral 1230 in FIG. 12, and alternatively, as reference numeral 214 in FIGS. 2-11), and the data network (shown as reference numeral 230 in FIGS. 2-11).

While several exemplary implementations of embodiments of this invention are described herein, various modifications and alternate embodiments will occur to those of ordinary skill in the art. For example, the DCC 200 may include wired, optical, and/or wireless components and/or other components (not shown). The DCC 200 may use any means of coupling each of the electronic components for communicating the incoming communication and/or associated data, but the coupling means is preferably high-capacity, high-bandwidth optical transport services, Gigabit Ethernet services, and/or the like. As those of ordinary skill in the art of computer telephony integration understand, the electronic components could also be coupled using other appropriate means, such as, for example a Synchronous Optical Network (SONET) structure with redundant, multiple rings. Copper conductors may also be used. Accordingly, this invention is intended to include those other variations, modifications, and alternate embodiments that adhere to the spirit and scope of this invention.

What is claimed is:
1. A method, comprising:
receiving, by a server, a communication associated with a recipient's communications address;
retrieving, by the server, global positioning system information associated with the recipient's communications address;
retrieving, by the server, a schedule associated with the recipient's communications address;
comparing, by the server, the schedule to a time associated with the communication and to the global positioning system information;
determining, by the server, that the global positioning system information and the time correspond to an entry in the schedule; and
selecting, by the server, an alternate destination for the communication in response to the global positioning system information and the time corresponding to the entry in the schedule.

2. The method of claim 1, further comprising querying a database for the recipient's communications address.

3. The method of claim 1, further comprising retrieving a rule to select the alternate destination.

4. The method of claim 1, further comprising determining an availability associated with the recipient's communications address.

5. The method of claim 1, wherein the communication comprises customer data.

6. The method of claim 1, further comprising sending a notification message to the recipient's communications address.

7. The method of claim 1, further comprising determining an unavailability associated with the recipient's communications address.

8. A system, comprising:
a processor; and
a memory device, the memory device storing code, the code when executed causing the processor to perform operations, the operations comprising:
receiving a communication to a recipient's communications address;
retrieving global positioning system information associated with the recipient's communications address;
retrieving a schedule associated with the recipient's communications address;
comparing the schedule to a time associated with the recipient's communications address and to the global positioning system information;
determining that the global positioning system information and the time correspond to an entry in the schedule; and
selecting an alternate destination for the communication in response to the global positioning system information and the time corresponding to the entry in the schedule.

9. The system of claim 8, wherein the operations further comprise querying a database for the recipient's communications address.

10. The system of claim 8, wherein the operations further comprise retrieving a rule to select the alternate destination.

11. The system of claim 8, wherein the operations further comprise determining an availability associated with the recipient's communications address.

12. The system of claim 8, wherein the communication comprises customer data.

13. The system of claim 8, wherein the operations further comprise sending a notification message to the recipient's communications address.

14. The system of claim 8, wherein the operations further comprise determining an unavailability associated with the recipient's communications address.

15. A memory device storing instructions which when executed cause a processor to perform operations, the operations comprising:

processing a communication to a recipient's communications address;

retrieving a schedule associated with the recipient's communications address;

comparing the schedule to a time associated with the recipient's communications address and to the global positioning system information;

determining a match between an entry in the schedule and the time associated with the recipient's communications address;

selecting an alternate destination for the communication in response to the match;

retrieving a profile associated with the recipient's communications address; and retrieving a rule associated with the recipient's communications address.

16. The memory device of claim 15, wherein the operations further comprise receiving a location associated with the recipient's communications address.

17. The memory device of claim 15, wherein the rule is based on an availability, a location and a communications device of the recipient.

18. The memory device of claim 15, wherein the operations further comprise determining an availability associated with the recipient's communications address.

19. The memory device of claim 15, wherein the communication comprises customer data, and wherein the retrieving of the profile is based on the customer data.

20. The memory device of claim 15, wherein the operations further comprise sending a notification message to the recipient's communications address in response to a failure of the match.

* * * * *